(12) United States Patent
Mundt et al.

(10) Patent No.: US 7,190,550 B2
(45) Date of Patent: Mar. 13, 2007

(54) AIR BEARING SLIDER HAVING A BEARING PROFILE CONTOURED FOR PRESSURIZATION PROXIMATE TO NODAL REGIONS OF A SLIDER-DISC INTERFACE

(75) Inventors: Michael David Mundt, Longmont, CO (US); Craig William Miller, Loveland, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 176 days.

(21) Appl. No.: 10/608,700

(22) Filed: Jun. 27, 2003

(65) Prior Publication Data
US 2004/0264052 A1    Dec. 30, 2004

(51) Int. Cl.
*G11B 5/60* (2006.01)
(52) U.S. Cl. ..................................... 360/110
(58) Field of Classification Search ............. 360/110, 360/235.4, 235.6, 235.7, 235.9, 236.3, 237, 360/236.4, 236.6, 235.8, 236, 236.1, 236.2, 360/236.8, 236.9; 369/300
See application file for complete search history.

(56) References Cited

U.S. PATENT DOCUMENTS

| | | | | |
|---|---|---|---|---|
| 5,353,180 A | * | 10/1994 | Murray | .............. 360/236.1 |
| 5,488,524 A | * | 1/1996 | Cunningham | .............. 360/236.8 |
| 5,872,685 A | | 2/1999 | Park et al. | .............. 360/103 |
| 5,982,582 A | * | 11/1999 | Ye et al. | .............. 360/236.4 |
| 6,198,601 B1 | | 3/2001 | Hira et al. | .............. 360/235.9 |
| 6,236,543 B1 | * | 5/2001 | Han et al. | .............. 360/236.6 |
| 6,275,467 B1 | * | 8/2001 | Wang et al. | .............. 369/300 |
| 6,411,468 B1 | * | 6/2002 | Park et al. | .............. 360/236.3 |
| 6,552,876 B1 | * | 4/2003 | Berg et al. | .............. 360/235.7 |
| 6,943,989 B2 | * | 9/2005 | Cha et al. | .............. 360/236.2 |
| 6,999,282 B2 | * | 2/2006 | Rao | .............. 360/236 |

OTHER PUBLICATIONS

K. G. Ashar, "Magnetic Disk Drive Technology", Figure 10.29, Institute of Electrical and Electronics Engineers, Inc., 1997.

* cited by examiner

*Primary Examiner*—Tianjie Chen
(74) *Attorney, Agent, or Firm*—Westman, Champlin & Kelly, P.A.

(57) ABSTRACT

An air bearing slider which includes a raised bearing surface or surfaces contoured to limit off nodal pressurization. The air bearing surfaces are located proximate to nodal regions of a height field or profile between the slider and disc surface to limit off-nodal pressurization. The air bearing slider includes a narrow raised bearing surface profile proximate to the trailing edge of the slider body and an expanded intermediate profile along an intermediate portion to provide lift and roll stability proximate to an intermediate nodal region of the slider body to limit off nodal pressurization.

20 Claims, 11 Drawing Sheets

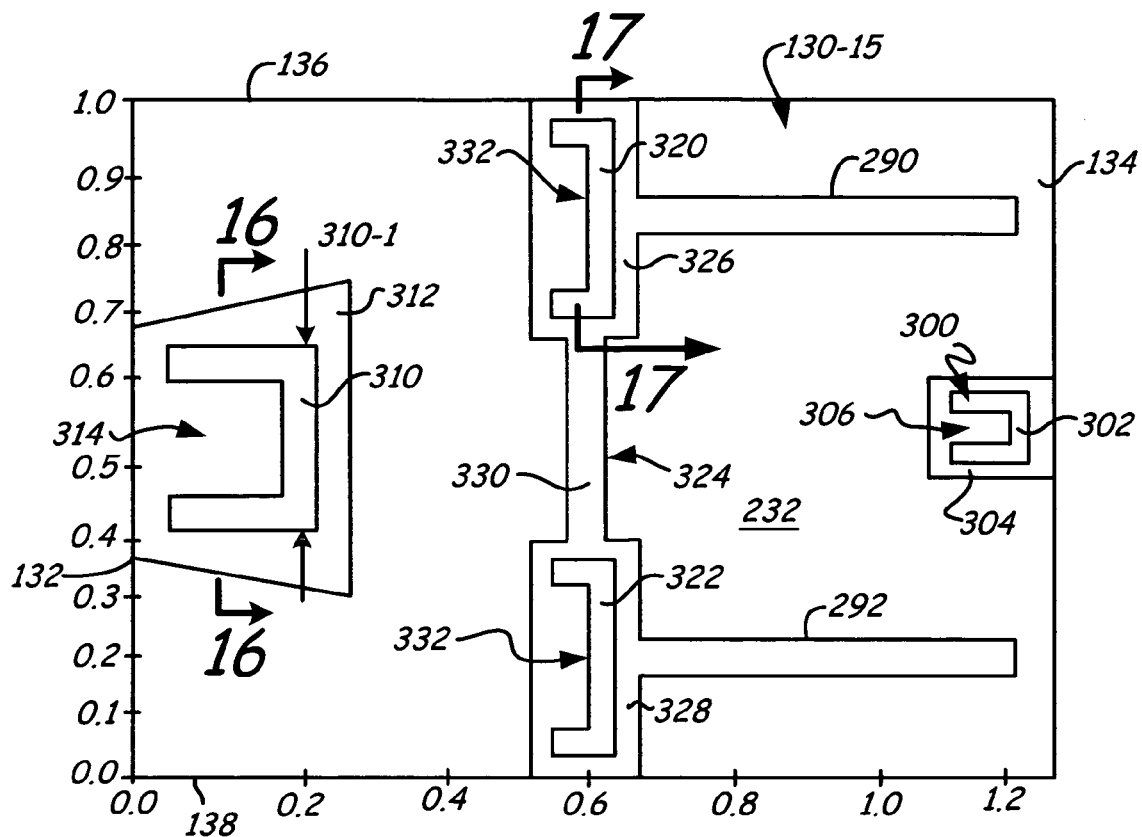
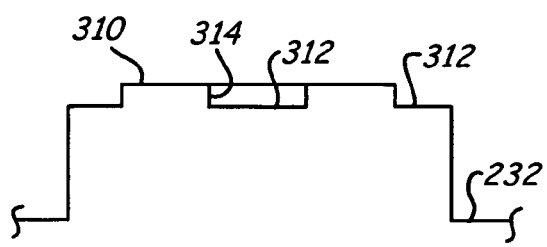
Fig. 16
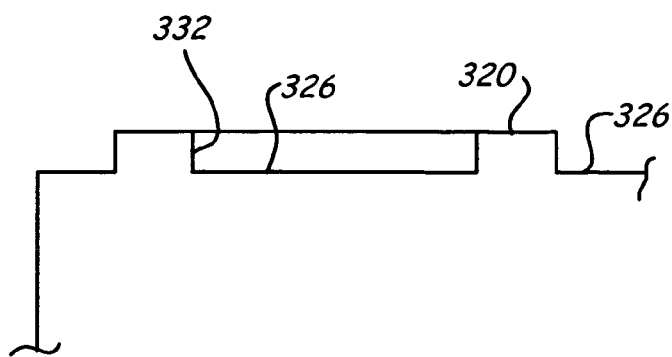
Fig. 17

AIR BEARING SLIDER HAVING A BEARING PROFILE CONTOURED FOR PRESSURIZATION PROXIMATE TO NODAL REGIONS OF A SLIDER-DISC INTERFACE

FIELD OF THE INVENTION

The present invention relates generally to a data storage device or system, and more particularly but not by limitation to an air bearing slider for a data storage device or system.

BACKGROUND OF THE INVENTION

Data storage devices store digitally encoded information on discs. Heads read data from or write data to discs which are supported for rotation relative to a base chassis by a spindle motor or drive. Heads include transducer elements, such as magnetoresistive, magneto-optical or inductive elements for read or write operations. An actuator assembly moves the head relative to select data tracks on the disc to read from or write data to the disc surface or media.

Typically the head includes an air bearing slider which is coupled to a head suspension assembly. Rotation of the disc creates an air flow along the air bearing slider to provide a pressure profile or lift force. The lift force of the air bearing slider is countered by a load force supplied via a load beam of the suspension assembly to define in part a fly height of the slider. Fabrication processes typically introduce variations in the height profile between the slider and disc surface or head-disc interface. The pressure profile of the air bearing slider is sensitive to distortions in the height profile which can interfere with fly height characteristics of the air bearing slider. Embodiments of the present invention provide solutions to these and other problems, and offer other advantages over the prior art.

SUMMARY OF THE INVENTION

An air bearing slider which includes a raised bearing surface contoured to limit off-nodal pressurization. The air bearing surfaces are located proximate to nodal regions of a height field or profile between the slider and disc surface to limit off-nodal pressurization. In an illustrative embodiment, the air bearing slider includes a narrow raised bearing surface profile proximate to a trailing edge of the slider body and an expanded raised bearing surface profile along an intermediate portion of the slider body to provide lift and roll stability and limit off-nodal pressurization. Other features and benefits that characterize embodiments of the present invention will be apparent upon reading the following detailed description and review of the associated drawings.

BRIEF DESCRIPTION OF THE DRAWINGS

FIGS. 15–17 illustrate another embodiment of an air bearing profile for an air bearing slider to limit off-nodal pressurization.

DETAILED DESCRIPTION OF ILLUSTRATIVE EMBODIMENTS

Figure 1:
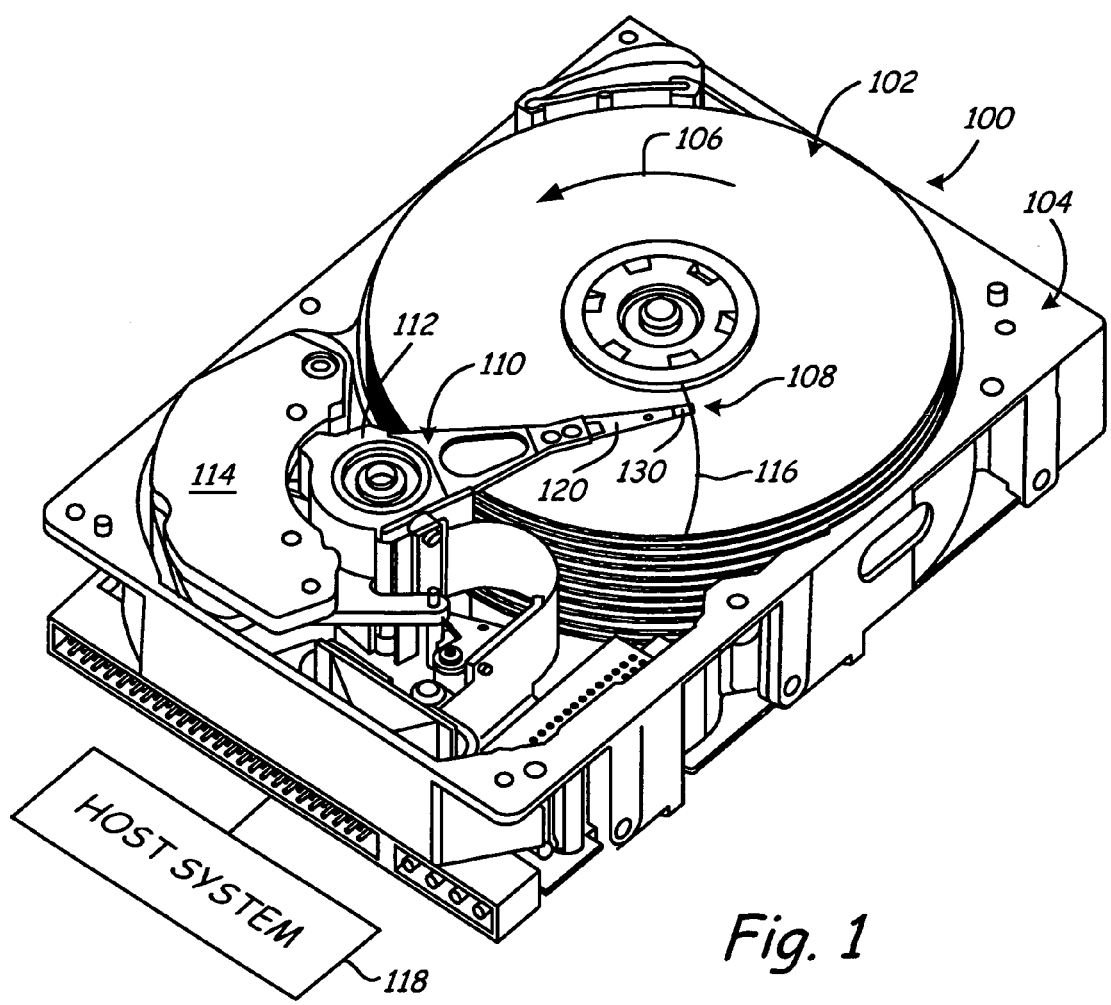
FIG. 1 is a perspective illustration of a data storage system or device.

FIG. 1 is a perspective illustration of a data storage device 100 in which embodiments of the present invention are useful. Device 100 includes a plurality of discs 102 rotationally coupled to a base chassis 104 via a spindle motor (not shown) as illustrated by arrow 106. Heads 108 (such as, for example, magnetoresistive, magneto-optical, giant magnetoresistive or inductive heads) are coupled to an actuator assembly 110 to position the heads 108 to read data from or write data to the discs 102. In the embodiment shown, the actuator assembly 110 includes an actuator 112 which is rotated via operation of a voice coil motor (VCM) 114 to move the head 108 as illustrated by arrow 116 relative to selected tracks on the disc 102 based upon commands or signals from a host computer or system 118 (illustrated schematically).

Figure 2:
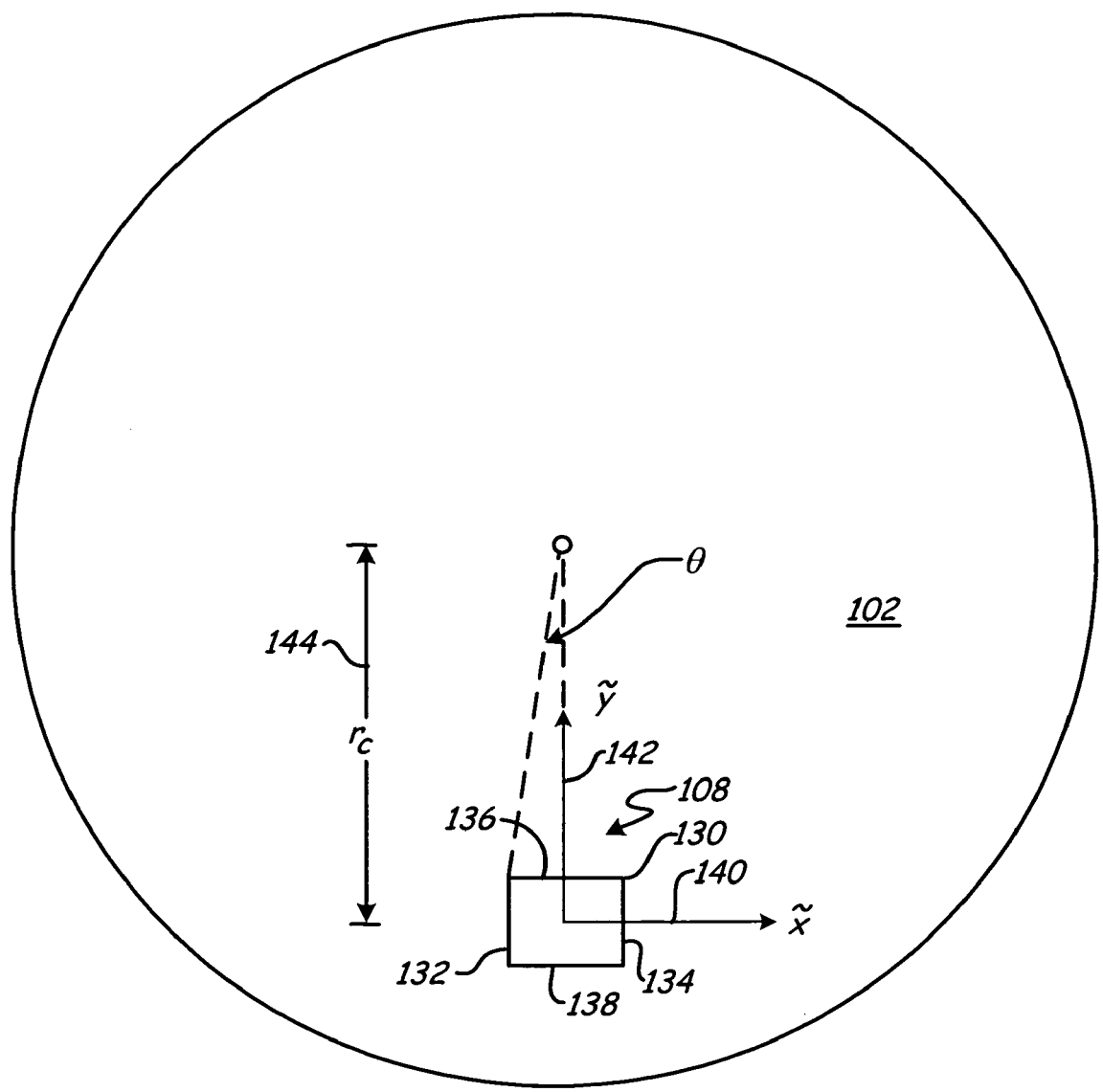
FIG. 2 is a schematic illustration of an air bearing slider relative to a disc surface.

In the embodiment shown, the head 108 is coupled to the actuator 112 via a suspension assembly 120. The suspension assembly 120 includes a gimbal spring (not shown) to allow the head 108 to pitch and roll to follow the topography of the disc surface. The head 108 includes an air bearing slider 130 which carries transducer elements for read or write operations. As shown in FIG. 2, a slider body of the air bearing slider 130 includes a leading edge 132, a trailing edge 134 and opposed sides 136, 138. Rotation of the disc 102 provides an air flow between the leading and trailing edges 132, 134 of the air bearing slider to provide an air bearing pressure profile which imparts a lifting force $F_{air\ bearing}$ to the air bearing slider 130. The lifting force $F_{air\ bearing}$ is countered by a load force supplied via the suspension assembly at a load point (about which the slider pitches and rolls) to define in part a fly height $H_{fly}$ of the slider or head above the disc surface 102.

The air bearing surface or slider is designed to provide a pressure profile for desired head media spacing (e.g. spacing between the transducer elements and a magnetic or other recording media) and slider fly height for read or write operations of the device. Air bearing pressure profiles are sensitive to distortions in the height profile or height field between the air bearing slider and the disc surface or media. Fabrication processes and disc characteristics, such as radial coning and disc waviness introduce distortions in the height profile or height field of the slider-disc interface.

In particular, the height profile is sensitive to radial coning of the disc as provided by $$S_{coning} = \alpha \frac{x^2 y}{2r_c^2} \qquad \text{Equation 1}$$

Where

S$_{coning}$ is a radial coning shape profile 150;

α is the radial coning amplitude;

x is an axial slider coordinate 140 (along x axis) or a length of the slider;

y is a radial or cross slider coordinate 142 (along y axis); and r$_c$ is a radius distance 144 from a center of disc 102.

For example, for a 1 inch (25.4 mm) disc, the inner radius is r$_c$~6 mm and for a coning parameter α=0.001, the maximum coning profile height is S$_{coning}$~2.7 nm or 0.11 μin. This profile or shape varies with respect to time since the shape or profile is not constant and is not easily compensated for by standard air bearing designs.

The height profile or field is also sensitive to disc waviness. A component of disc waviness can be approximated by an azimuthal wave h=β sin(θ) as provided by $$S_{wave} = \frac{\beta xy}{r_c^2} \qquad \text{Equation 2}$$

where

S$_{wave}$ is a wave shape or profile 152;

β is the wave amplitude;

x,y are slider coordinates 140, 142; and r$_c$ is a radius distance 144 from the center of the disc 102.

For example, for a wave amplitude β=0.002 mm, the maximum amplitude of the profile is S$_{wave}$=1.56 nm (or 0.062 μin) for a r$_c$=20 mm and S$_{wave}$=17.4 nm (or 0.68 μin) for r$_c$=6 mm. Again, the profile or shape will vary with respect to time and will shift depending upon the phase of angle θ.

Figure 3:
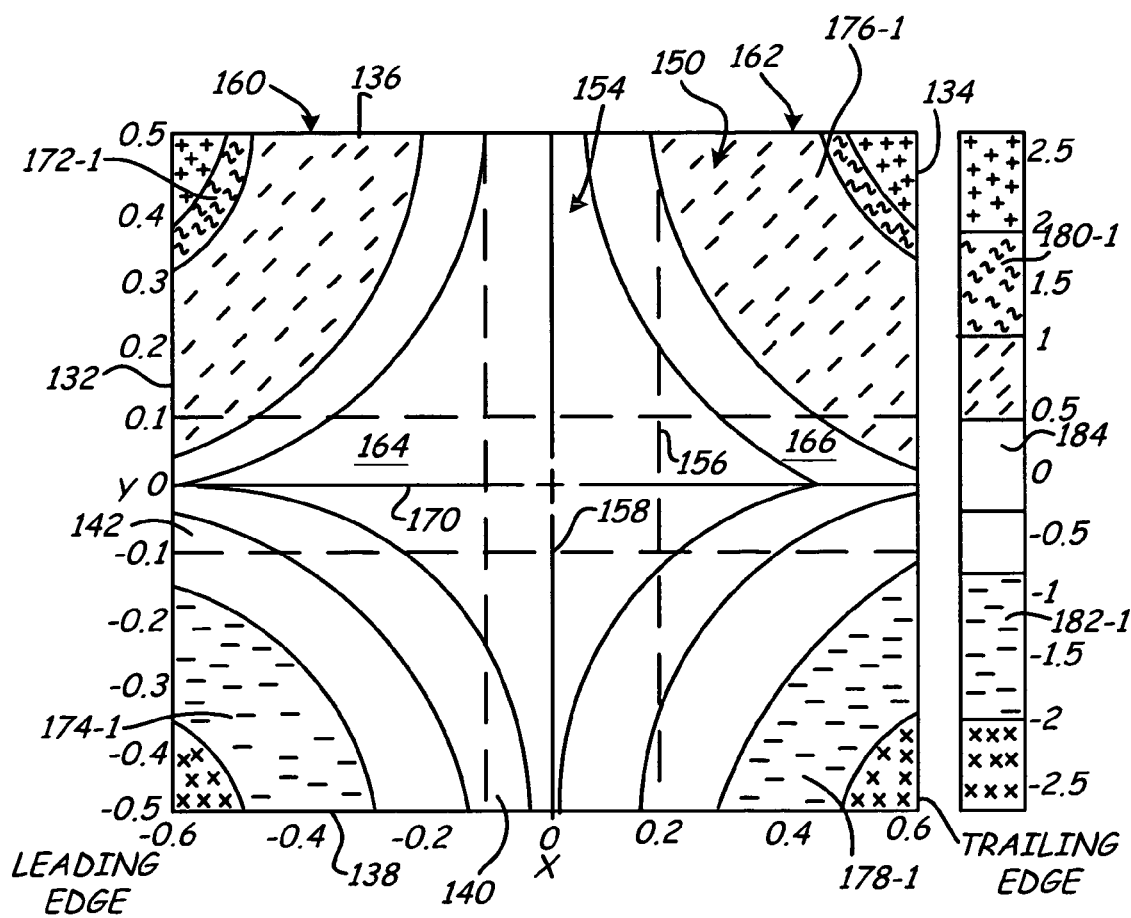
FIGS. 3–4 illustrate height profiles due to radial coning and disc waviness, respectively.
Figure 4:
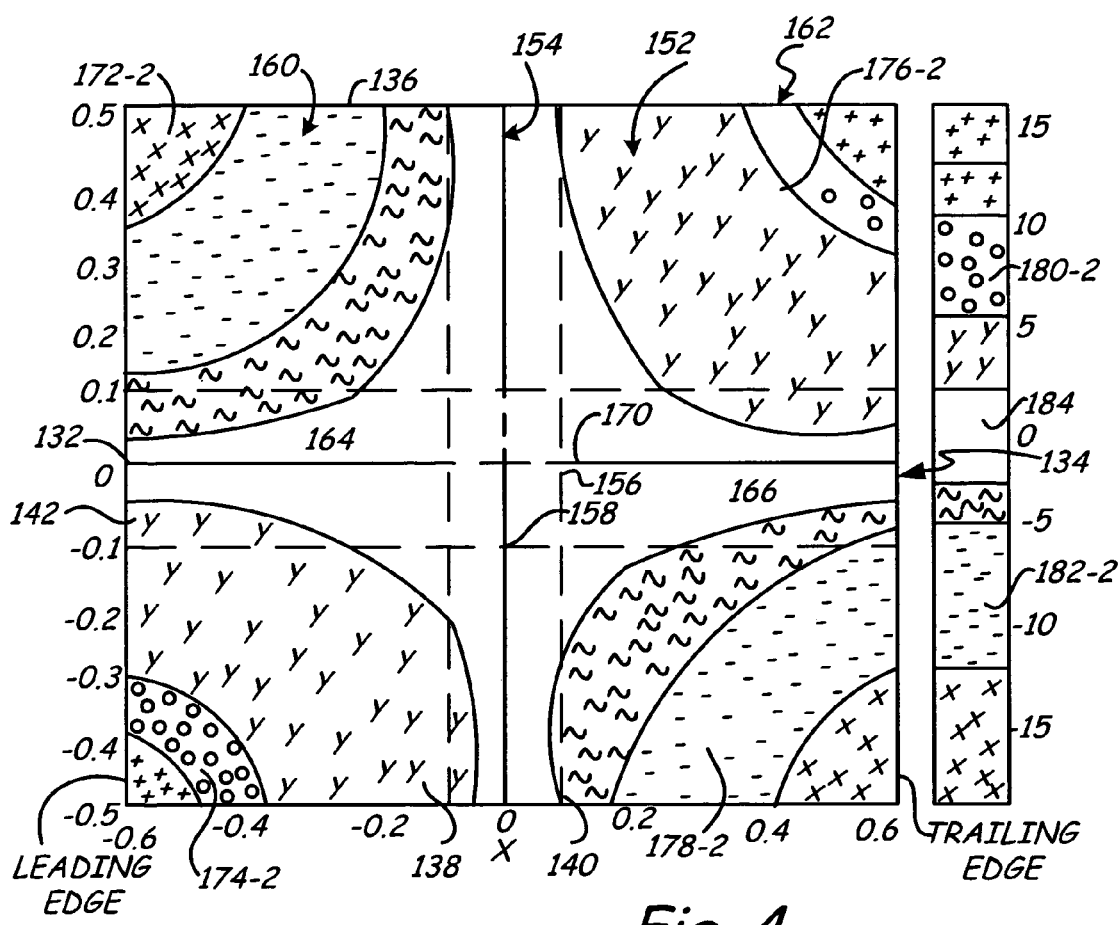

FIGS. 3–4 graphically illustrate shape or profiles 150, 152 for radial coning (for α=0.001 and r$_c$=6 mm) and disc waviness (for β=0.002 and r$_c$=6 mm) relative to the slider coordinates 140, 142. As shown, the shape or profiles 150, 152 have a nodal region 154 along an intermediate portion 156 of the slider body relative to center or nodal axis 158. Leading and trailing edge portions 160, 162 of the slider body include cross nodal regions 164, 166 relative to cross axis 170 (or a dynamic axis of the slider body about which the slider rolls). The leading and trailing edge portions 160, 162 also include off-nodal regions 172, 174 and 176, 178 on opposed sides of the cross nodal regions 164, 166. Off-nodal regions 172, 174, 176, 178 have a positive 180 or negative 182 height or amplitude relative to node amplitude 184. The amplitude of the height field in the nodal region 154, 164 and 166 is relatively small in comparison to amplitude or distortion in the off-nodal regions 172, 174, 176, 178 proximate to corners of the slider body. Thus, as described, the nodal regions of the height profile are located proximate to the intermediate portion 154 or center axis 158 and cross axis 170 of the slider body generally irrespective of the skew angle of the slider.

In particular, as shown in FIG. 3, radial coning of the disc produces positive off-nodal regions 172-1, 176-1 having a positive height amplitude 180-1 relative to node amplitude 184 along the inner side 136 of the slider body and negative off-nodal regions 174-1, 178-1 having a negative height amplitude 182-1 relative to node amplitude 184 proximate along the outer side 138 of the slider body to introduce an effective cross curve or twist about cross axis 170 of the slider body. The effective cross curve or twist affects roll and fly height parameters of the slider body relative to the disc surface. The effect of the cross curve or twist due to radial coning becomes more significant for small disc dimensions or form factors relative to the nominal fly height or fly height budget of the head since the twist factor or effect increases quadratically as the radius of the disc decreases as provided by Equation 1.

Disc waviness based upon an azimuthal wave component as graphically illustrated in FIG. 4 introduces a positive off-nodal region 176-2 and a negative off-nodal region 178-2 relative to inner and outer sides 136, 138 of the slider body-proximate to the trailing edge 134 of the slider body. Positive off-nodal region 176-2 and negative off-nodal region 178-2 having positive and negative height amplitudes 180-2, 182-2 relative to node amplitude 184 to introduce an effective twist or cross curve along the trailing edge portion 162 of the slider body as provided by Equation 2. The phase of the twist will change as the slider body traverse around the disc since the shape or profile of the disc waviness varies relative to angle θ as provided by Equation 2. Although FIG. 4 graphically illustrates a component of disc waviness approximated by an azimuthal wave, actual disc waviness may have multiple sinusoidal components and varies with respect to time.

Figure 5:
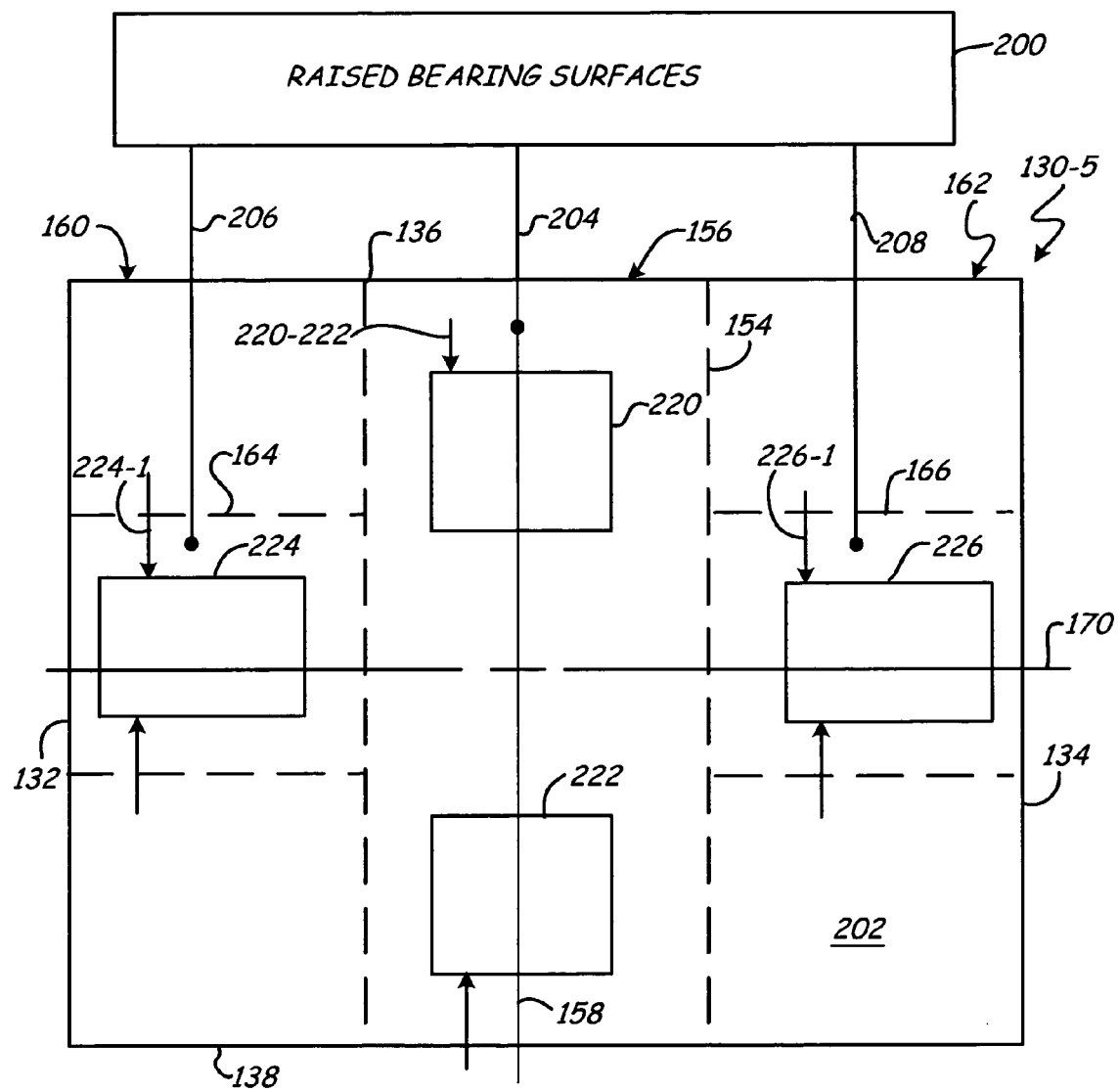
FIG. 5 is a schematic illustration of an air bearing profile for an air bearing slider to limit off-nodal pressurization.

FIG. 5 schematically illustrates an embodiment of a contoured bearing profile for pressurization proximate to nodal regions of a slider body where like numbers are used to refer to like parts in the previous FIGS. As schematically shown, the air bearing slider 130-5 includes a raised bearing surface or surfaces 200, which are elevated above milled or recessed surface 202. The raised bearing surfaces have a shape or profile for pressurization proximate to nodal regions 154, 164 or 166 of the slider body as illustrated by lines 204, 206, 208 to limit off-nodal pressurization and effect of height field or height profile distortions relative to the fly height of the slider body.

In the particular embodiment shown in FIG. 5, the intermediate portion 156 of the slider body is positioned between leading and trailing edge portions 160, 162 of the slider body and has an axial length dimension between the leading and trailing edges 132, 134 no larger than the length dimension of the leading edge portion 160 and no larger than the length of the trailing edge portion 162 of the slider body. In the illustrated embodiment the raised bearing surface(s) 200 included opposed side pads 220, 222 to provide lift and roll stability along the intermediate portion 156 of the slider body and a leading edge pad 224 and a trailing edge pad 226 although application of the present invention is not so limited.

As shown, the leading edge pad 224 and trailing edge pad 226 have a narrow cross width or profile dimension 224-1, 226-1 along a cross width between opposed sides 136, 138 of the slider body to provide a raised bearing surface having a cross width dimension or profile in the cross nodal portions of the slider body to limit off-nodal pressurization and provide a pressure profile which is less sensitive to shape variations in the slider-disc interface or height field. The opposed side pads 220, 222 have an expanded cross width profile 220–222 relative to the narrow cross width profile of the raised rearing surface along the leading and trailing edge portions to provide lift and pressurization in the nodal region along the intermediate portion 156 of the slider body. Although FIG. 5 illustrates a slider embodiment including a leading edge pad 224 having a narrow cross width profile, the leading edge pad can have a larger cross width profile since the raised bearing surfaces along the leading edge portion 160 have a smaller percentage twist effect than along the trailing edge portion 162 relative to nominal transducer spacing.

Figure 6:
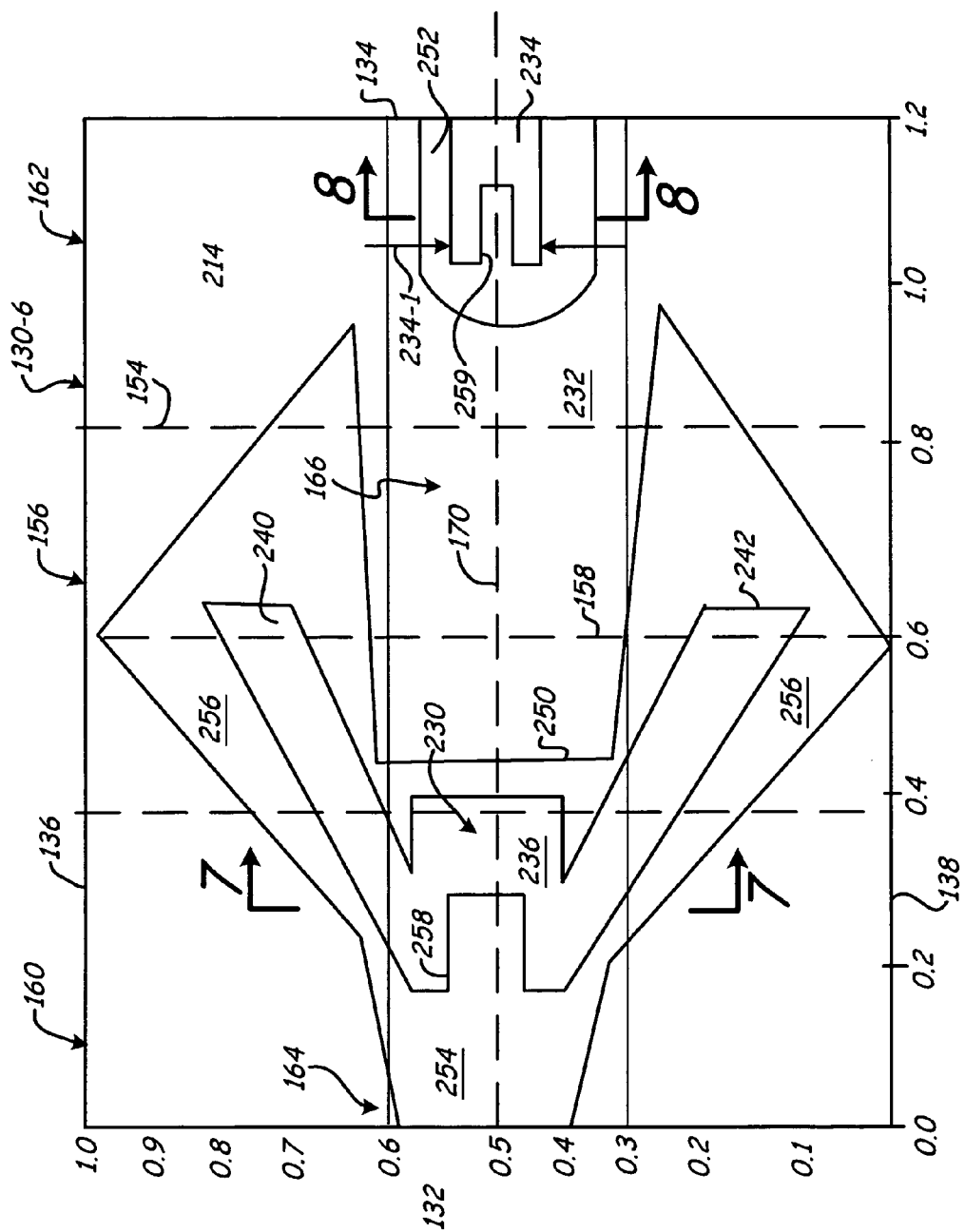
FIGS. 6–8 illustrate an alternate embodiment of an air bearing profile for an air bearing slider to limit off-nodal pressurization.
Figure 7:
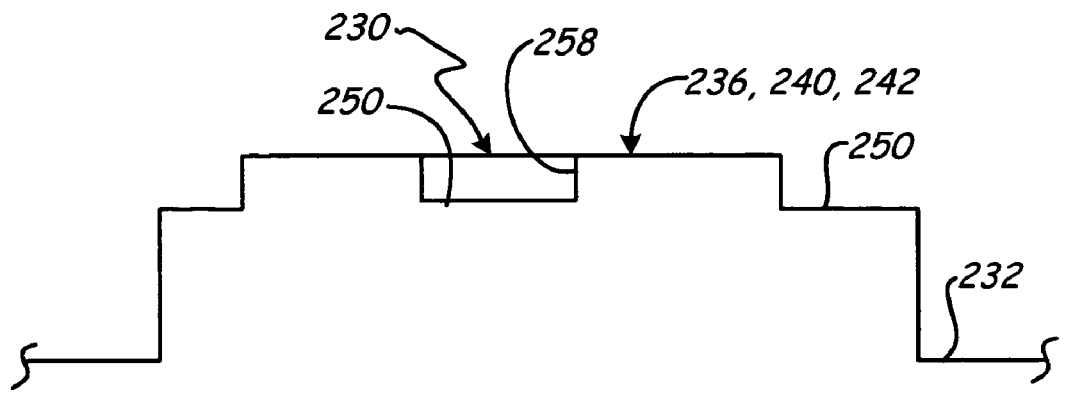
Figure 8:
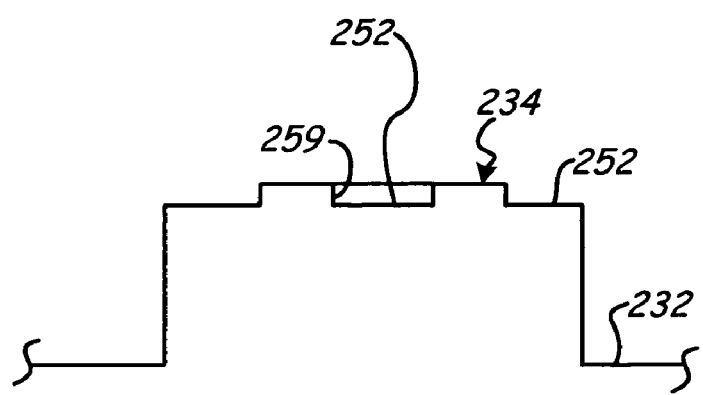
Figure 9:
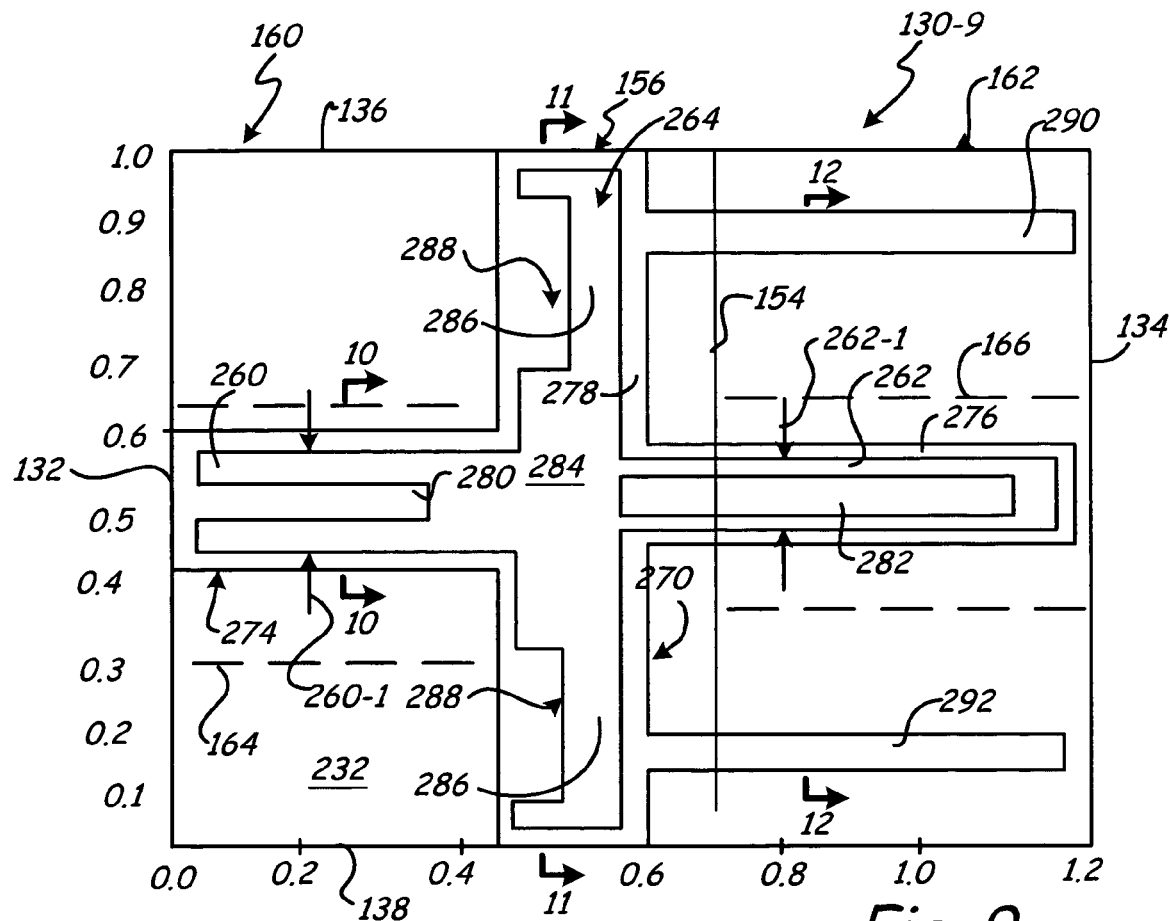
FIGS. 9–12 illustrate another embodiment of an air bearing profile for an air bearing slider to limit off-nodal pressurization.
Figure 10:
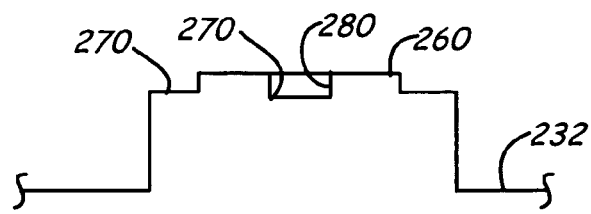
Figure 11:
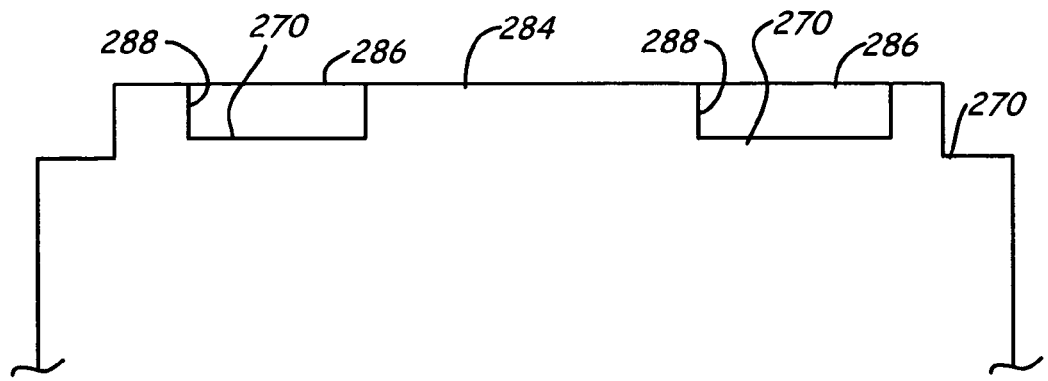
Figure 12:
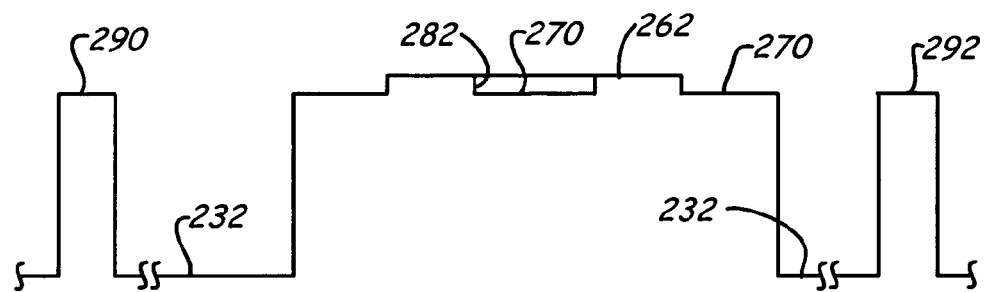

FIGS. 6–8 illustrate an alternate embodiment of an air bearing slider 130-6 including a contoured bearing profile according to the present invention. As shown, the slider 130-6 includes a raised bearing surface 230 elevated above a recessed or milled bearing surface 232 and a trailing edge center pad 234 having a raised bearing surface elevated above the recessed bearing surface 232. The raised bearing surface of the trailing edge center pad 234 has a narrow cross width profile 234-1 proximate to cross nodal portion 166 of the slider body. The raised bearing 230 is profiled or contoured relative to the nodal portions 164, 154 along the leading edge and intermediate portions of the slider body. The raised bearing 230 includes a raised leading edge portion 236 and raised rail portions 240, 242. The leading edge portion 236 has a narrow raised bearing surface cross profile or dimension along the leading edge portion 160 to limit pressurization of the off-nodal regions or portions. Rails 240, 242 extend outwardly at an angle relative to the leading edge portion 236 to provide an expanded cross width profile or dimension for the raised bearing surface or surfaces along the intermediate portion 156 of the slider body to provide pressurization and roll stability along the intermediate nodal portion.

As shown, the slider body includes stepped bearing surfaces 250 and 252 elevated above the recessed bearing surface 232 and below raised bearing surfaces 230, 234 to provide a stepped interface to the raised bearing surfaces 230, 234. Stepped bearing surface 250 extends from the leading edge portion 160 and is contoured to have a narrow stepped cross width profile proximate to a leading edge stepped portion 254 and an expanded stepped cross width profile portions 256 along the intermediate nodal portion. In particular, portion 256 of the stepped bearing surface 250 have triangular shaped stepped profile which includes an outwardly and inwardly sloped profile along the intermediate nodal portion to provide a contoured stepped cross width profile surface to limit off-nodal pressurization. Stepped bearing surface 252 has a narrow stepped cross width profile in the embodiment shown.

As shown, the raised bearing surface 230 includes a leading edge trench 258 proximate to raised leading edge portion 236 to provide air flow from the stepped bearing portion 250 to the raised bearing surface 230. The stepped bearing surface provides a stepped surface to pressurize the raised bearing surface and extends within the intermediate portion 156 of the slider body to enhance suction. The narrow cross width profile of the leading edge stepped portion 254 provides a stepped surface in the cross nodal portion to limit off-nodal pressurization along the leading edge of the slider body. Center pad 234 also includes a leading edge trench 259 to provide air flow from stepped surface 252 to the raised bearing surface or surfaces. In an alternate embodiment, leading edge combs (not shown) could be included along a leading edge bearing surface to filter or block debris and particles. Recessed and stepped bearing surfaces are fabricated via known milling and etching processes to provide a recessed surface below the substrate or zero milled surface of the raised bearing surface or surfaces. In particular in one embodiment the recessed or stepped bearing surfaces can be milled or etched to a depth of 0.1–0.3 microns.

FIGS. 9–12 illustrate an alternate air bearing slider 130-9 embodiment having a contoured bearing profile of the present invention. As shown, the slider 130-9 includes a leading edge rail portion 260 having a raised bearing surface elevated above the recessed surface 232, a trailing edge rail portion 262 and a cross rail 264 in the intermediate portion 156 of the slider body. The raised bearing surface of rail 260 has a narrow cross width profile 260-1 along the cross nodal 164 portion of the slider body. The trailing edge rail portion 262 similarly has a narrow cross width profile 262-1 along the cross nodal portion 166. Cross rail 264 has an expanded cross width profile between opposed sides 136, 138 of the slider body along the intermediate portion 156 of the slider body. Cross rail 264 has a shortened length dimension between the leading and trailing edges thereof to provide a contoured raised bearing surface in the intermediate nodal zone to limit off-nodal pressurization.

In the embodiment shown, the slider body includes stepped bearing surface or surfaces 270 elevated above the recessed bearing surface 232 and below the raised bearing surfaces. The stepped bearing surface(s) 270 includes leading and trailing edge portions 274, 276 and a cross rail portion 278 to provide a stepped interface to raised rails 260, 262 and raised cross rail 264. Leading and trailing edge portions 274, 276 have a narrow stepped cross width profile in the cross nodal zones and the cross rail portion 278 has an expanded cross width profile along the intermediate portion of the slider body or along the intermediate nodal zone 154.

As shown, the raised rail 260 includes a leading edge trench 280 from stepped surface 270 forming a "U" shaped raised rail portion and the trailing edge rail 262 include a stepped channel 282 from stepped surface 270. Raised cross rail 264 include an cross nodal body 284 and opposed side body portions 286 having a length dimension along the intermediate portion of the slider body. As shown, opposed side body portions 286 include a leading edge trench 288 from the stepped surface 270 to the raised bearing surface of cross rail 264. In the embodiment shown in FIG. 9, the trailing edge portion of the slider body include stepped rails 290, 292 having a stepped surface elevation outside the cross nodal region to provide roll stability along the trailing edge portion of the slider body. Stepped rails 290, 292 are recessed below the raised bearing surfaces and thus do not significantly contribute to the pressure profile of the raised bearing surfaces.

Figure 13:
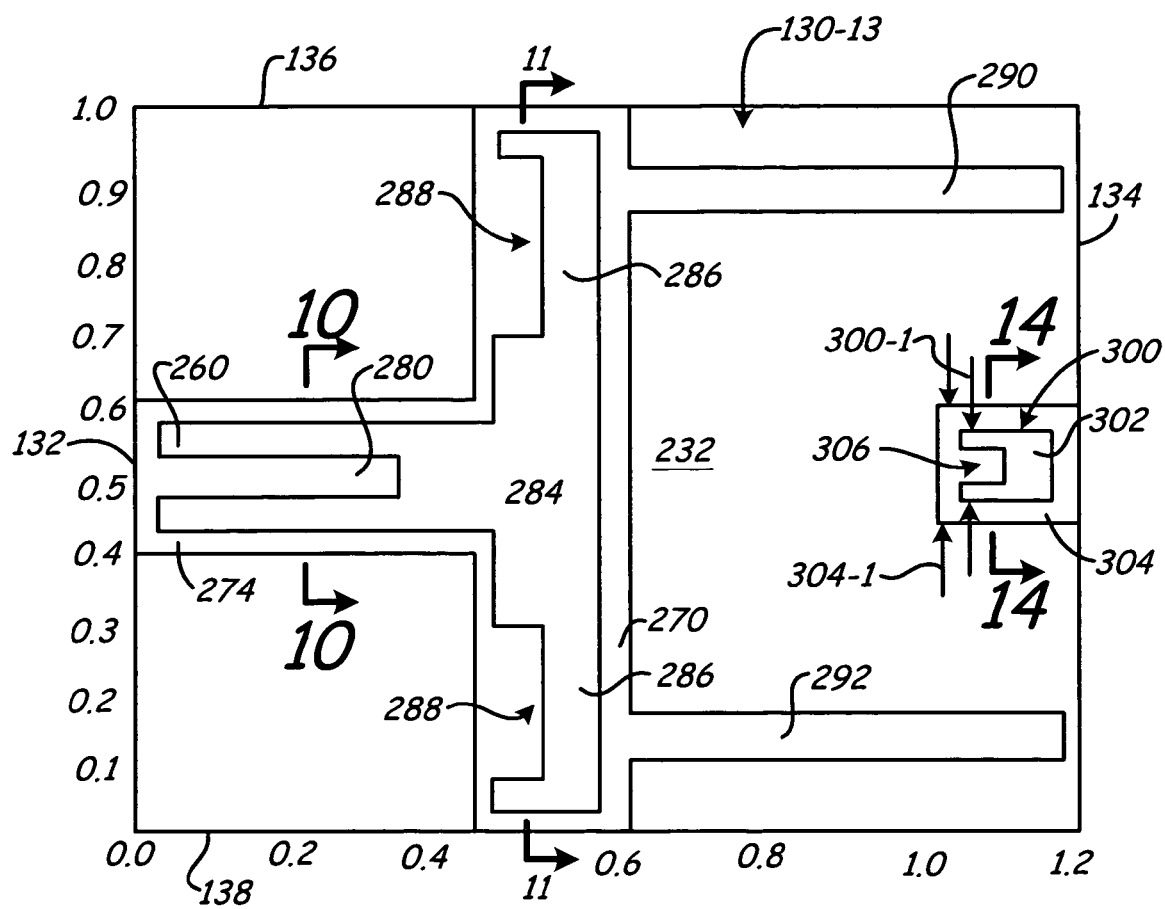
FIGS. 13–14 illustrate another embodiment of an air bearing profile for an air bearing slider to limit off-nodal pressurization.
Figure 14:
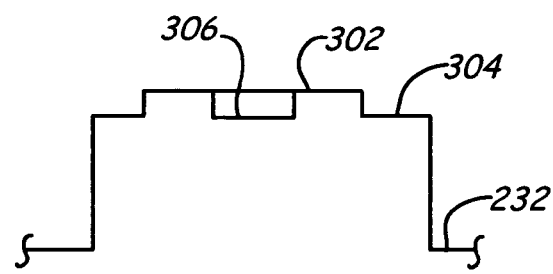

FIGS. 13–14 illustrate an alternate embodiment of air bearing slider 130-13 similar to FIGS. 9–12 where like numbers are used to identify like parts in the previous FIGS. In the embodiment illustrated in FIGS. 13–14, the slider 130-13 includes a trailing edge center pad 300 having a raised bearing surface 302 elevated above a stepped pad 304. The trailing edge pad 300 has a narrow cross width dimension or profile 300-1 along the cross nodal portion of the slider body to limit off-nodal pressurization. As shown the trailing edge pad 300 includes a leading edge trench 306 from the stepped bearing pad 304 to funnel or direct air for pressurization of the raised bearing surface 302. Stepped pad 304 also has a narrow stepped cross width dimension or profile 304-1 as shown.

FIGS. 15–17 illustrate an alternate embodiment where like numbers are used to refer to like parts in the previous FIGS. As shown, the slider 130-15 includes a raised leading edge bearing pad 310 forming a raised bearing surface having a narrow cross width profile 310-1 along the leading edge portion of the slider body. Raised bearing surface of the leading edge bearing pad 310 is elevated above a stepped surface of stepped pad 312 elevated above recessed surface 232. Stepped pad 312 also has a narrow stepped cross width dimension or profile to limit off-nodal pressurization. As shown, the raised bearing pad 310 is "U" shaped to form a leading edge trench 314 from the stepped pad 312 to provide a channel to pressurize the raised bearing pad 310.

The slider 130-15 includes opposed pads 320, 322 and a stepped cross rail 324 along the intermediate portion of the slider body having an expanded cross width profile in the intermediate nodal region or portion 154. In the embodiment shown, stepped cross rail 324 has side portions 326, 328 and a narrow cross portion 330. The pads 320, 322 are generally "U" shaped to provide a stepped channel 332 from stepped rail 324 to the raised bearing surfaces of the pads 320, 322 for pressurization of pads 320, 322 to provide a pressure profile having pressurized regions in the nodal regions of the slider disc interface. Pads 320, 322 are spaced to provide pressurization and roll stability along the intermediate portion of the slider body with limited off-nodal pressurization.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a magnetic storage device, it will be appreciated by those skilled in the art that the teachings of the present invention can be applied to other data storage devices, such as optical devices without departing from the scope and spirit of the present invention.

What is claimed is:

1. An air bearing slider comprising:
   a slider body including a leading edge, a trailing edge and opposed sides and including an elongate length between the leading and trailing edges having a leading edge portion, a trailing edge portion and an intermediate portion proximate to a center axis of the slider body and a cross width between the opposed sides and the slider body including a center portion and opposed side portions;
   a raised bearing surface or surfaces including a center portion along the leading edge portion of the slider body having a gap in a cross width direction within the center portion of the slider body and a bearing surface or surfaces within the intermediate portion having an expanded cross width relative to the cross width of the center portion; and
   a stepped bearing surface or surfaces recessed from the raised bearing surface or surfaces and the stepped bearing surface or surfaces having a cross width profile that includes a narrowing cross width dimension that narrows in a direction towards the trailing edge of the slider body from the intermediate portion.

2. The slider of claim 1 wherein the slider body includes a cavity surface or surfaces recessed below the raised bearing surface or surfaces and the leading edge portion includes opposed corner portions proximate to the opposed side portions and the trailing edge portion includes opposed corner portions proximate to the opposed side portions and each of the opposed corner portions forms the cavity surface or surfaces.

3. The slider of claim 1 wherein each of the raised bearing surface or surfaces on the leading edge portion of the slider body collectively form a narrow cross width profile within the center portion of the slider body.

4. An air bearing slider comprising:
   a slider body having a leading edge, a trailing edge, opposed sides and a cross width between the opposed sides;
   a raised bearing surface or surfaces elevated above a recessed surface or surfaces and the raised bearing surface or surfaces including a center portion having a narrow cross width spaced from the opposed sides of the slider body along a leading edge portion of the slider body and a center portion spaced from the opposed sides proximate to the trailing edge of the slider body; and
   a trench proximate to the center portion of the raised bearing surface or surfaces along the leading edge portion of the slider body and a leading edge step and opposed side steps from the trench to the center portion along the leading edge portion of the slider body.

5. The slider of claim 4 wherein the raised bearing surface or surfaces includes a cross rail along an intermediate portion of the slider body.

6. The slider of claim 5 wherein the cross rail includes opposed side portions and the opposed side portions of the cross rail include leading edge trenches to pressurize the raised bearing surface or surfaces of the raised cross rail.

7. The slider of claim 5 wherein the intermediate portion includes a stepped cross rail having a shortened length dimension along the intermediate portion of the slider body and an expanded stepped cross dimension.

8. The slider of claim 4 wherein an intermediate portion of the slider body includes a stepped cross rail forming a stepped bearing surface or surfaces along the intermediate portion of the slider body.

9. The slider of claim 4 wherein the raised bearing surface or surfaces include divergent bearing rails or surfaces which extend outwardly from the center portion along the leading edge portion of the slider body.

10. The slider of claim 9 wherein the divergent bearing rails or surfaces are formed on a stepped bearing surface along an intermediate portion of the slider body.

11. An air bearing slider comprising:
    a slider body having a leading edge, a trailing edge and opposed sides;
    a raised bearing surface or surfaces including a center portion along a leading edge portion of the slider body having a narrow leading edge cross width, and including side portions extending outwardly from the center portion within an intermediate portion of the slider body and a center pad proximate to the trailing edge spaced from opposed sides of the slider body;
    a stepped bearing surface proximate to the center pad and recessed from the center pad and elevated from a cavity surface.

12. The slider of claim 11 wherein the raised bearing surface or surfaces include divergent bearing surface or surfaces extending along an the intermediate portion of the slider body.

13. The slider of claim 12 wherein the divergent bearing surface or surfaces include opposed side rails angled outwardly in a direction of the trailing edge.

14. The slider of claim 13 wherein the angled side rails extend outwardly from the center portion.

15. The slider of claim 13 and comprising a leading edge stepped surface elevated from the cavity surface and recessed from the raised bearing surface or surfaces of the angled side rails.

16. The slider of claim 13 wherein the slider body includes a stepped bearing surface having a tapered outer profile elevated from the cavity surface and the angled side rails are formed on the tapered stepped bearing surface.

17. The slider of claim 12 wherein the divergent bearing surface or surfaces include bearing rails on opposed sides of a cross axis of the slider body along the intermediate portion of the slider body and the bearing rails angle outwardly in a direction toward the trailing edge of the slider body.

18. The slider of claim 17 wherein the bearing rails extend from the center portion and the slider includes a stepped bearing surface elevated from the cavity surface having a narrow cross width along the leading edge portion and an expanded cross width along the intermediate portion of the slider body, wherein the bearing rails and the center portion are formed on the stepped bearing surface.

19. The slider of claim 12 including a stepped bearing surface or surfaces recessed from the raised surface or surfaces and elevated from the cavity surface proximate to the divergent bearing surface or surfaces to pressurize the divergent bearing surface or surfaces.

20. An air bearing slider comprising:

a slider body including a leading edge, a trailing edge and opposed sides; and bearing surface means on the slider body for limiting off-nodal pressurization.

* * * * *

UNITED STATES PATENT AND TRADEMARK OFFICE
CERTIFICATE OF CORRECTION

| | | |
|---|---|---|
| PATENT NO. | : 7,190,550 B2 | Page 1 of 1 |
| APPLICATION NO. | : 10/608700 | |
| DATED | : March 13, 2007 | |
| INVENTOR(S) | : Mundt et al. | |

It is certified that error appears in the above-identified patent and that said Letters Patent is hereby corrected as shown below:

Column 8,

Line [47], delete "width, and" and insert --width and-- .

Signed and Sealed this

Seventh Day of August, 2007

JON W. DUDAS
*Director of the United States Patent and Trademark Office*